Patented Apr. 17, 1945

2,373,942

UNITED STATES PATENT OFFICE 2,373,942

CATALYTIC HYDROXYLATION OF OLEFINIC DOUBLE BONDS

Ingolfur Bergsteinsson, El Cerrito, Calif., assignor to Shell Development Company, San Francisco, Calif., a corporation of Delaware No Drawing. Application January 5, 1942, Serial No. 425,628

8 Claims. (Cl. 260—635)

This invention relates to a process for effecting the oxidation and/or hydroxylation of unsaturated organic compounds. More particularly, it provides a practical and economical process for effecting the hydroxylation of organic compounds containing an olefinic linkage between two carbon atoms of aliphatic character to polyhydroxy organic compounds.

The process of the invention is executed by treating an unsaturated organic compound containing an olefinic linkage between two carbon atoms of aliphatic character with hydrogen peroxide, or a compound, such as an organic peroxide, capable of yielding hydrogen peroxide or active peroxide oxygen under the conditions of operation, in the presence of water and a tungstic acid at a temperature and for a time adequate to effect the desired hydroxylation and/or oxidation.

It is known that some olefinic compounds can be hydroxylated by treatment with certain inorganic or organic peracids or by reaction with hydrogen peroxide. The known methods, which are executed in the substantial absence of water, have not warranted commercial application because the methods themselves are difficult and costly to operate and their operation results in low yields of the desired polyhydroxy products. In many cases, and particularly when the hydroxylation is effected in the presence of an organic peracid, a large part of the produced polyhydroxy compound is esterified, thus decreasing the yield of the desired product and giving rise to difficult and costly separation and recovery problems. The present process overcomes these and other inherent disadvantages of the known methods and provides a commercially applicable process which is easily and inexpensively controlled to give high yields of the desired products. The catalysts used are easily and inexpensively prepared, and they are easily recovered from the reaction mixture. The fact that aqueous solutions or mixtures of hydrogen peroxide, hydrocarbon peroxides and other reagents liberating peroxide oxygen under the operating conditions are used in the execution of the process makes for greater ease, greater control and greater safety of operation.

The process is applicable to the hydroxylation and/or oxidation of any unsaturated organic compound containing at least one olefinic linkage, said olefinic linkage being between two carbon atoms of aliphatic character. Representative groups of such organic compounds are the olefins such as ethylene, proylene, the butylenes, the amylenes, the hexylenes, cetene and the like; the cyclic olefins such as cyclopentene, cyclohexene, methyl cyclopentene, ethyl cyclohexene and the like, the open chain and cyclic diolefins such as butadiene, the pentadienes, the hexadienes, cyclopentadiene, methyl cyclopentadiene, cyclohexadiene, and the like; the unsaturated halides, such as vinyl chloride, allyl chloride, allyl bromide, crotyl chloride, methallyl chloride and the like; the unsaturated alcohols such as allyl alcohol, crotyl alcohol, methyl vinyl carbinol, methallyl alcohol, ethallyl alcohol, and the like; the unsaturated ethers such as diallyl ether, dicrotyl ether, dimethallyl ether, allyl methyl ether, allyl ethyl ether, methallyl ethyl ether, crotyl propyl ether, allyl glyceryl ether, and the like, and the homologues and suitable substitution products of the listed compounds.

The process of the invention is of particular commercial value as applied to the direct catalytic hydroxylation of olefins to the corresponding glycols, of unsaturated alcohols to the corresponding saturated polyhydric alcohols, and of unsaturated monohalides to the corresponding saturated monohalohydrins. It may also be advantageously applied to the preparation of hydroxylated esters, ethers, and acids and to the production of aldehydes, ketones, carboxylic acids, and other oxidation products. The following are a few representative examples of the many conversions that may be effected: ethylene to ethylene glycol; propylene to propylene glycol; isobutylene to glutaric dialdehyde or isobutylene glycol; cetene to cetene glycol; trimethylethylene to trimethylene glycol; cyclopentadiene to cyclopentane diols; allyl alcohol to glycerol; methallyl alcohol to beta-methyl glycerol; methyl vinyl carbinol to alpha-methyl glycerol; allyl chloride to glycerine monochlorhydrin; methallyl chloride to beta-methyl glycerine monochlorhydrin; crotonic acid to beta-hydroxy butyric acid; oleic to di-hydroxy stearic acid; vinyl bromide or acetate to glycolaldehyde; di-vinyl ether to glycolaldehyde; allyl ethers to diglyceryl ether; methallyl ether to beta-methyl glyceryl ether; ethyl crotonate and diethylmaleate to the corresponding hydroxylated esters, cyclohexene to the adipic aldehyde or adipic acid.

The process of the invention is applicable with excellent results to the hydroxylation of the allyl-type unsaturated alcohols to glycerols and the hydroxylation of the allyl-type unsaturated monohalides to the corresponding glycerine monohalohydrins. For example, allyl alcohol may be hydroxylated to glycerol, methyl vinyl carbinol and crotyl chloride may be hydroxylated to alpha-methyl glycerol, methallyl alcohol may be hydroxylated to beta-methyl glycerol, allyl chloride may be hydroxylated to glycerine monochlorhydrin, allyl bromide may be hydroxylated to glycerine monobromhydrin, crotyl chloride and methyl vinyl carbinyl chloride may be hydroxylated to alpha-methyl glycerine chlorhydrin, methallyl chloride may be hydroxylated to beta-methyl glycerine chlorhydrin, etc.

The allyl-type unsaturated alcohols and the allyl-type unsaturated halides contain the characteristic allyl group (C=C—C$^I$) wherein the C$^I$ carbon atom is saturated and directly linked to a hydroxy group or to a single halogen atom. These compounds may be represented by the general formula

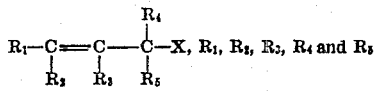

representing hydrogen atoms, hydrocarbon radicals or substituted hydrocarbon radicals, and X being a hydroxy group or a halogen atom. Representative radicals which $R_1$, $R_2$, $R_3$, $R_4$ and $R_5$ may represent are, for example, methyl, ethyl, propyl, butyl, tertiary butyl, amyl, secondary amyl, cyclopentyl cyclopentenyl, cyclohexyl, benzyl, phenyl, substituted hydrocarbon radicals, such as the carbinol group, a chlormethyl group, a bromomethyl group, a chlorethyl group, and the like and their homologues.

In executing the present invention, which has for its chief object the provision of a practical and economical process adapted to the technical scale production of the above and other hydroxylated and/or oxygenated compounds, either pure hydrogen peroxide, mixtures which contain hydrogen peroxide, or other substances capable of yielding hydrogen peroxide or active peroxide oxygen under the operating conditions, may be employed. Peroxides resulting from the non-explosive incomplete oxidation of hyrocarbons may be used in the performance of the process with excellent results. These peroxides may be prepared by subjecting propane, butane, propylene, cyclopropane, etc., to the action of oxygen for a short time at 300–500° C., the ratio of oxygen to hydrocarbon being preferably of the order of 1:9. Examples of other substances that may be employed in lieu of pure hydrogen peroxide are the complex compounds of hydrogen peroxide with urea and inorganic peroxygenated compounds such as persulfuric acid and ammonium sulfate, which yield hydrogen peroxide upon hydrolysis. The terms "peroxide" and "hydrogen peroxide" as used herein and in the appended claims are to be understood as encompassing such substances as well as pure hydrogen peroxide and organic peroxides, particularly the hydrocarbon peroxides.

It has been found that the hydroxylation and/or oxidation of organic compounds of the defined class can be effectively accomplished with hydrogen peroxide when the reaction is conducted in the presence of a tungstic acid. Suitable tungstic acids are, for example, pertungstic acid and the heteropolytungstic acids. Examples of suitable heteropolytungstic acids are silicotungstic acid, borotungstic acid, the various phosphotungstic acids and the like. These tungstic acids function as catalysts in the process and apparently dissociate hydrogen peroxide into free hydroxyl radicals which then add on to double bonds, or they promote other oxidations, depending upon the control exercised.

It has been further found that pertungstic acid is formed when tungstic oxide (WO$_3$) is treated with hydrogen peroxide, hence, in executing the process a suitable tungstic acid catalyst may be prepared by treating a quantity of tungstic oxide sufficient to give the concentration of catalyst desired with all or part of the peroxide being applied to effect the particular oxidation. In general, 1 gram of tungstic oxide is employed for each gram atom of peroxide oxygen. Finally divided tungstic oxide showing the following analysis has proven quite suitable for the purposes of the invention:

| | Per cent |
|---|---|
| Iron | 0.015 |
| SO$_4$ | 0.02 |
| I | 0.05 |
| HNO$_3$ | 0.05 |

The peroxide may be in aqueous or non-aqueous solution, and is preferably of a strength of 29–30%, although weaker or stronger solutions may be used. While the use of aqueous peroxide is more convenient and the best results are obtained therewith, and while the invention is accordingly directed toward providing a process performable in an aqueous medium, anhydrous peroxide may be employed if felt desirable in a particular case. Solvents applied in the making up of anhydrous peroxide solutions are preferably of a type that do not readily undergo oxidation. A number of such solvents may be found among the saturated ethers and nitriles and the tertiary alcohols. For example, the tungstic oxide may be dissolved in a solution of hydrogen peroxide in tertiary butyl alcohol which may be prepared by mixing 30% aqueous peroxide and tertiary butyl alcohol in the ratio 1:4, thereafter effecting stratification of a water and alcohol layer through the addition of a suitable salt such as anhydrous sodium or calcium sulfate and then concentrating the alcohol layer (containing 5–10% of the peroxide), after separation and further treatment with the sulfate, by vacuum distillation, preferably in all-glass apparatus. A satisfactory anhydrous solution of hydrogen peroxide may also be prepared by the azeotropic distillation under pressure of a mixture consisting of one part aqueous peroxide and two to three parts tertiary amyl alcohol.

In executing the process of the invention in the preferred manner as applied to liquid and solid compounds, the reagent thus prepared, consisting of pertungstic acid and hydrogen peroxide dissolved in water, or other suitable solvent, is added to the compound to be treated, which may or may not be in solution, and permitted to remain in contact therewith until all or a major portion of the peroxide is consumed, after which the glycol or other oxygenated product is separated by distillation or other suitable means. In most instances, and always when aqueous peroxide has been used, exhaustion of the peroxide is marked by the settling out of tungstic oxide. This follows from the fact that the continued existence of the pertungstic acid is dependent upon the presence of peroxide in the solution and when the peroxide is consumed the insoluble oxide is precipitated. Appearance of the yellow oxide which can be removed by a simple decanting, centrifugation or filtering step, furnishes a convenient visual indication of the completion of the reaction. The catalyst is preferably recovered from the reacted mixture prior to separation of the product therefrom.

The reaction may take place in the presence of solvents or diluents other than the solvent in which the peroxide and catalyst are dissolved, and such solvents or diluents may be immiscible with the solvent of the reagent. These materials may be added through the medium of the compound to be treated which may be dissolved or dispersed therein, or to the reagent solution, or after the reagent solution and compound to be oxidized have been brought together. While inner diluents are generally preferred, the use of compounds which enter into the reaction is sometimes indicated. For example, in oxidizing an olefin if the acetic acid ester of the corresponding glycol is the product desired, the reaction can be advantageously conducted in the presence of acetic acid, or acetic anhydride. The need for conducting the reaction in a heterogeneous medium may arise where the reaction product is of explosive character and must, for that reason, be discharged rapidly, or where in order to obtain complete oxidation of a particular compound it is necessary to remove the product at frequent intervals to prevent equilibrium.

When the unsaturated organic compound to be treated is a gas, such as ethylene, the process may be executed in several ways. One method is to shake the reagent and gas together under a gas pressure of any practical magnitude. If desired, solubility enhancing agents, such as soaps, may be added to increase the quantity of gas going into solution. Another method is to pass the reagent solution and the gas countercurrently in a bubble plate or packed tower, the gas being made to enter the bottom of the tower and the reagent solution at the top. Such a tower may also be used when oxidizing liquids or dissolved or dispersed solids. However, for this purpose, an ordinary closed kettle type reactor provided with stirring and temperature control means and fitted with a reflux condenser, whereby vaporized materials are returned to the reaction zone has been found adequate.

The principal controlling factors which determine the course of the reaction, whether the substance being oxidized is a gas, liquid or solid, are the temperature, extent of dilution of the reactants and catalyst in the reaction mixture and the ratio of peroxide to the catalyst and the unsaturated compound treated. Of these, the most critical is the temperature. The exact temperature favoring the addition of hydroxyl radicals varies depending upon the compound being subjected to treatment, but it is generally between about 0° C. and 60° C., and preferably between 20° C. and 60° C. Higher operating temperatures generally encourage further oxidation, consequently, where it is desired to produce aldehydes, ketones, carboxylic acids and the like, temperatures in excess of this range are recommended.

In applying the process to the production of hydroxy compounds, the reaction is preferably conducted in dilute solution, preferably a dilute aqueous solution, with at least the stoichiometrical amount of peroxide present relative to the unsaturated compound treated. While the concentration of the solution has no important effect upon the rate of reaction, it has been found that solutions containing from 1 to 6 mols of reactants per liter provide substantially larger yields than are attained with more concentrated solutions. Aqueous solutions are preferred, because the process is easier to execute, better yields are obtained, and catalyst recovery is simplified as previously explained. The use of a greater quantity of peroxide than that theoretically required to effect a given hydroxylation does not tend toward the formation of aldehydes, ketones, acids, etc., to the extent that might be expected. And, in this connection, reference is made to the following table showing the results of tests conducted with allyl alcohol, the desired product being glycerol.

*Oxidation of allyl alcohol to glycerol*

[Temperature, 40° C.]

| Concentration of catalyst, gms. per liter | Concentration of reactants | | Per cent excess peroxide | Approx. time in days to react 95% of peroxide | Per cent conversion of alcohol to glycerol | Per cent yield of glycerol based on alcohol reactant |
|---|---|---|---|---|---|---|
| | Alcohol mols/liter | Peroxide, mols/liter | | | | |
| 1.6 grams | 1.6 | 2.00 | 25 | 2 | 65.0 | 72.2 |
| 1.6 grams | 1.6 | 2.58 | 60 | 3 | 71.3 | 72.6 |
| 1.6 grams | 1.6 | 3.52 | 120 | 3 | 78.1 | 78.6 |
| 1.6 grams | 1.6 | 4.80 | 200 | 3 | 80.6 | 80.6 |

In these experiments, which show a loss of glycerol by oxidation of only 7% between the spread 25% excess peroxide and 200% excess peroxide, peroxides obtained from propane oxidation were used as the hydroxylating agent. Such a large excess of pure hydrogen peroxide as that used in the last two tests is not recommended because of the greater reactivity of the pure compound and the consequent greater danger of product oxidation. It is to be understood that while the use of excess peroxides is desirable from the standpoint of the percent of treated compound converted as shown by the table, it is not essential or in any way critical. It does, in fact, lead to slight complications in catalyst recovery as the excess peroxide must be first dissipated before the catalyst will precipitate out as the oxide. This may be accomplished in any known manner, such as through the use of finely powdered manganese oxide or finely powdered carbon.

The application of the process of the invention to the production of glycerol from allyl alcohol is considered of special significance. This reaction is preferably conducted at room temperature (approximately 25° C.) or at slightly higher temperatures. One advantage of employing slightly higher temperatures (30–50° C.) resides in the effect upon the speed of reaction. For example, in a test conducted at room temperature, it required 5 days for 95% of the peroxide to react, whereas at 40° C. other factors being equal, only one day was required. At temperatures between 50 and 60° C., the rate of reaction is further accelerated, but the advantage is offset by loss of alcohol through evaporation, unless proper preventive measures, such as increasing the pressure within the reactor and/or refluxing, are taken.

Varying the catalyst concentration over the range of 1 to 10 grams per mol of reactants does not have any marked influence on the yield or conversion of allyl alcohol to glycerol, but decreasing the concentration to the extent of .1 gram for each gram atom of peroxide oxygen nearly doubles the reaction time. Since the catalyst settles as the yellow oxide upon consumption of the peroxide, if the reaction has been conducted in a dilute aqueous solution as recommended, and can be substantially completely recovered, no great care need be exercised to use any particular amount, although a sufficient quantity should be used to reach a reasonably rapid rate of reaction. Solutions from which the catalyst has been separated following consumption of the active oxygen upon analysis reveal the presence of tungsten only to the extent of .001% to .003% of the original quantity present. This loss, based on a conversion of 65% of alcohol to glycerol easily obtainable by the present process, amounts to not more than .2 cent per pound of product.

The following examples are introduced for the purpose of illustrating preferred modes of executing the invention and the results to be expected therefrom.

*Example I*

In a suitable reaction vessel about .2 gm. tungstic oxide was dissolved in about 0.2 mol of hydrogen peroxide (30%) and to this was added an aqueous solution of about 0.2 mol of allyl alcohol of such a concentration as to give approximately 150 cc. of reaction mixture. After 4 days at room temperature yellow tungstic oxide separated; the yield of glycerol, based on the peroxide used, was 83.0%.

*Example II*

The above experiment was repeated, substituting a mixture of hydrogen peroxide and various organic peroxides for the pure hydrogen peroxide; otherwise, the quantities and conditions were the same as in Example I above. After 7 days at room temperature tungstic oxide separated and the product was analyzed for glycerol and allyl alcohol. The yield on peroxide oxygen was 64.3% and on allyl alcohol reacted 78.9%.

*Example III*

A mixture of about 10 mols of methyl vinyl carbinol, 11 to 12 mols of hydrogen peroxide of about the same concentration as specified in Example I, and about 10 gms. of tungstic oxide was diluted to approximately 12 liters with water and allowed to stand in a 40° C. bath for 3 days, at the end of which period substantially all of the peroxide had been consumed. The solution was thereafter concentrated in a large pyrex jar containing a stainless steel steam coil. During the concentration most of the tungstic oxide and about 15 to 20 gms. of tarry polymer separated and were removed. Distillation of the dark-colored concentrate from a Claisen flask yielded 763 gms. of a-methyl glycerol representing a conversion and yield of 72% and 75%, respectively.

*Example IV*

3 mols of methallyl alcohol, about 6 gms. tungstic oxide, and about 3.05 mols of 30% hydrogen peroxide were placed in a reaction vessel of suitable size and made up to a total volume of about 3 liters with water. The temperature reached 55° C. in about 30 minutes and the reaction was controlled by immersing the flask in ice for short intervals. In two hours less than 2% of the peroxide remained. Distillation of the product gave 0.068 mol of methallyl alcohol and 2.43 mols (257 gms.) of b-methyl glycerol of a very good color. The conversion and yield were 81.3% and 83%, respectively.

*Example V*

A solution consisting of 1 gram of phosphotungstic acid dissolved in about 1 mol of 30% $H_2O_2$ was prepared. To this was added an aqueous solution of about 1 mol of allyl alcohol of such concentration as to give approximately 1 liter of reaction mixture. In 45 hours at 40° C., 97% of the peroxide was consumed. The conversion of alcohol to glycerol was 78% and the yield based on the alcohol reacted 89%.

The glycols obtainable by the present invention are useful as solvents and as intermediate in the preparation of other compounds having comparable or even greater commercial value. The many uses for glycerol in industry, especially the cosmetic, pharmaceutical, and explosive industries, are well known. Equally well known is the importance of ethylene glycol as a freezing point depressant.

I claim as my invention:

1. A process for the production of alpha-methyl glycerol which comprises treating methyl vinyl carbinol with hydrogen peroxide in the presence of water and pertungstic acid at a temperature in the range of from about 20° C. to 60° C.

2. A process for the production of glycerol which comprises treating allyl alcohol with hydrogen peroxide in the presence of water and pertungstic acid at a temperature in the range of from about 20° C. to 60° C.

3. A process for the production of glycerol which comprises treating allyl alcohol with hydrogen peroxide in the presence of water and phosphotungstic acid at a temperature in the range of from 20° C. to 60° C.

4. A process for the production of glycerol which comprises treating allyl alcohol with hydrogen peroxide in the presence of water and a heteropolytungstic acid at a temperature in the range of from 0° C. to 60° C.

5. A process for the production of glycerol which comprises treating allyl alcohol with hydrogen peroxide in the presence of water and a tungstic acid at a temperature in the range of from 0° C. to 60° C.

6. A process for the production of a saturated trihydric alcohol which comprises treating an unsaturated monohydric alcohol, the unsaturation of which is due solely to an olefinic linkage between two aliphatic carbon atoms one of which is directly linked to the carbinol group, with hydrogen peroxide and water in the presence of a tungstic acid at a temperature of from 0° C. to 60° C.

7. A process for the production of glycerol which comprises reacting allyl alcohol with hydrogen peroxide in the presence of water and a tungstic acid at a temperature in the range of from 0° C. to 60° C., said hydrogen peroxide being formed in situ under the reaction conditions from hydrocarbon peroxides obtained by non-explosive incomplete oxidation of hydrocarbons.

8. A process for the production of a saturated trihydric alcohol which comprises reacting an unsaturated monohydric alcohol, the unsaturation of which is due solely to an olefinic linkage between two aliphatic carbon atoms one of which is directly linked to the carbinol group, with hydrogen peroxide in the presence of water and a tungstic acid at a temperature of from 0° C. to 60° C., said hydrogen peroxide being formed in situ under the reaction conditions from hydrocarbon peroxides obtained by non-explosive incomplete oxidation of hydrocarbons.

INGOLFUR BERGSTEINSSON.